(12) United States Patent
Balakrishnan et al.

(10) Patent No.: US 11,330,032 B2
(45) Date of Patent: May 10, 2022

(54) METHOD AND SYSTEM FOR CONTENT PROXYING BETWEEN FORMATS

(71) Applicant: VMWARE, INC., Palo Alto, CA (US)

(72) Inventors: Neelima Balakrishnan, Palo Alto, CA (US); Charitha Bandi, Bangalore (IN); Abhinav Gupta, Palo Alto, CA (US); Chandra Sekhar Kondamuri, Palo Alto, CA (US); Abhijeet Joglekar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/792,313

(22) Filed: Feb. 17, 2020

(65) Prior Publication Data

US 2021/0112110 A1 Apr. 15, 2021

(30) Foreign Application Priority Data

Oct. 15, 2019 (IN) .............................. 201941041696

(51) Int. Cl.
*H04L 29/02* (2006.01)
*H04L 65/60* (2022.01)
*H04L 67/02* (2022.01)
*H04L 65/61* (2022.01)

(52) U.S. Cl.
CPC ........ *H04L 65/607* (2013.01); *H04L 65/4069* (2013.01); *H04L 67/02* (2013.01)

(58) Field of Classification Search
CPC .... H04L 65/607; H04L 65/4069; H04L 67/02
See application file for complete search history.

(56) References Cited

U.S. PATENT DOCUMENTS

| | | | |
|---|---|---|---|
| 9,609,078 B2 | 3/2017 | Zhang | |
| 10,122,816 B2 | 11/2018 | Zhang | |
| 2013/0034100 A1* | 2/2013 | Goyal | G06N 5/027 370/392 |
| 2015/0341212 A1* | 11/2015 | Hsiao | G06F 3/0482 715/735 |
| 2016/0277299 A1* | 9/2016 | Kadaba | H04L 41/142 |
| 2017/0170844 A1* | 6/2017 | Bhattacharjee | H03M 7/6052 |

* cited by examiner

*Primary Examiner* — Adnan M Mirza
(74) *Attorney, Agent, or Firm* — Adeli LLP

(57) ABSTRACT

A technique for content proxying is described. The technique includes receiving from a first device a stream of data. The stream of data is formatted in a format that does not indicate content length in a header. A received payload of the stream of data is encoded into a data chunk including a chunk length header and the received payload. The data chunk is forwarded to a second device that does not support the format.

20 Claims, 5 Drawing Sheets

METHOD AND SYSTEM FOR CONTENT PROXYING BETWEEN FORMATS

RELATED APPLICATIONS

Benefit is claimed under 35 U.S.C. 119(a)-(d) to Foreign Application Serial No. 201941041696 filed in India entitled "METHOD AND SYSTEM FOR CONTENT PROXYING BETWEEN FORMATS", on Oct. 15, 2019, by VMware, Inc., which is herein incorporated in its entirety by reference for all purposes.

BACKGROUND OF THE INVENTION

Computer networks are increasingly used to provide communication between devices. For example, in large-scale networks such as data centers and enterprise networks, high volumes of traffic can be transmitted and received to allow clients to access and use applications hosted on servers. To support traffic between two devices, a data stream between the two devices is established. This data stream has a particular format, or set of protocols, that is supported by both the server and the client. This common format allows the server and client to communicate. For example, a client may send data to and receive data from a server via a data stream conforming with an HTTP/1 protocol. As a result, the client may access utilizes applications hosted by the server.

In some cases, the client and server desiring to communicate utilize different formats. For example, the client may utilize a format that requires an in-packet notification of the amount of data carried by the packets while the server utilizes a format that does not use an in-packet notification of the amount of data per packet or uses a different type of notification of the amount of data per packet. This difference in protocols may prevent communication between the client and server. Consequently, a mechanism for allowing communication between devices that do not support the same format is desired.

BRIEF DESCRIPTION OF THE DRAWINGS

Various embodiments of the invention are disclosed in the following detailed description and the accompanying drawings.

DETAILED DESCRIPTION

Figure 1:
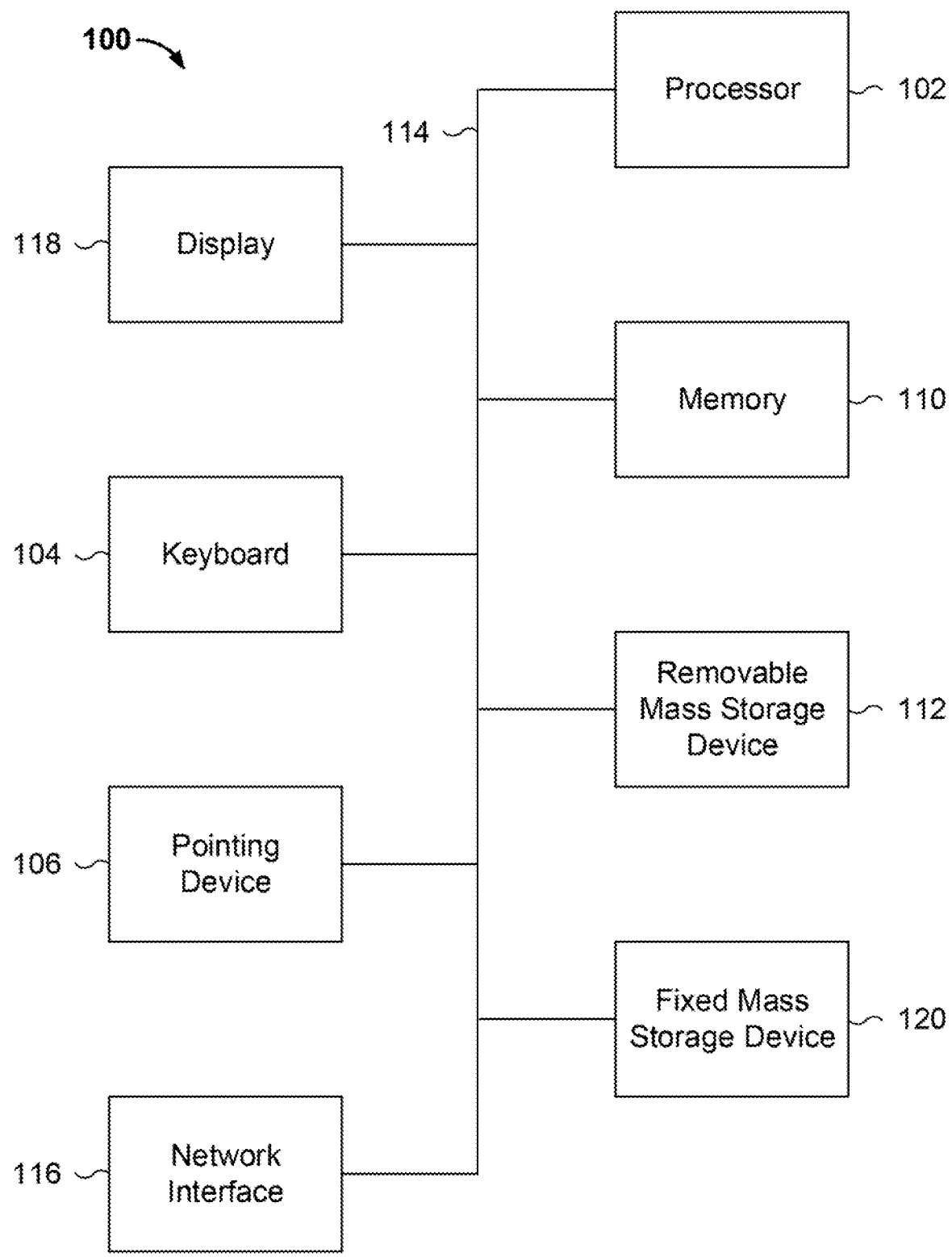
FIG. 1 is a functional diagram illustrating a programmed computer system for content proxying in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for content proxying is described. The technique includes receiving a stream of data from a first device. The stream of data is formatted in a format that does not indicate content length in a header. A received payload of the stream of data is encoded into a data chunk including a chunk length header and the received payload. The data chunk may also include a chunk trailer having a delimiter for the data chunk. The data chunk is forwarded to a second device that does not support the format. In some embodiments, the first device is a client and the second device is a server. In some embodiments, the first device is a server and the second device is a client. The format for the first device may be a framing-based format, such as HTTP/2. In such embodiments, the second device may support a different format such as an HTTP/1 format. In some embodiments, the received payload includes data from a read of a client socket such that the received payload is encoded into the data chunk without buffering. In some embodiments, buffering may be selectively enabled (or disabled) by a user or administrator for buffering up to a configured amount of data. In such embodiments, the configured amount of data, e.g., 32 MB, may be buffered from an initial portion of the stream of data. The configured amount of data is encoded into an initial data chunk including an initial chunk length header and the configured amount of data. The initial data chunk is forwarded to the second device. Subsequently, data may be forwarded and encoded without buffering. In some embodiments in which buffering is enabled, the stream of data has a total size not exceeding the configured amount of data. In such embodiments, the stream of data is buffered and encoded into a content length packet including a content length header and the total size. The content length packet may then be forwarded to the second device.

FIG. 1 is a functional diagram illustrating a programmed computer system for performing content proxying in accordance with some embodiments. As will be apparent, other computer system architectures and configurations can be used. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a nontransitory computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
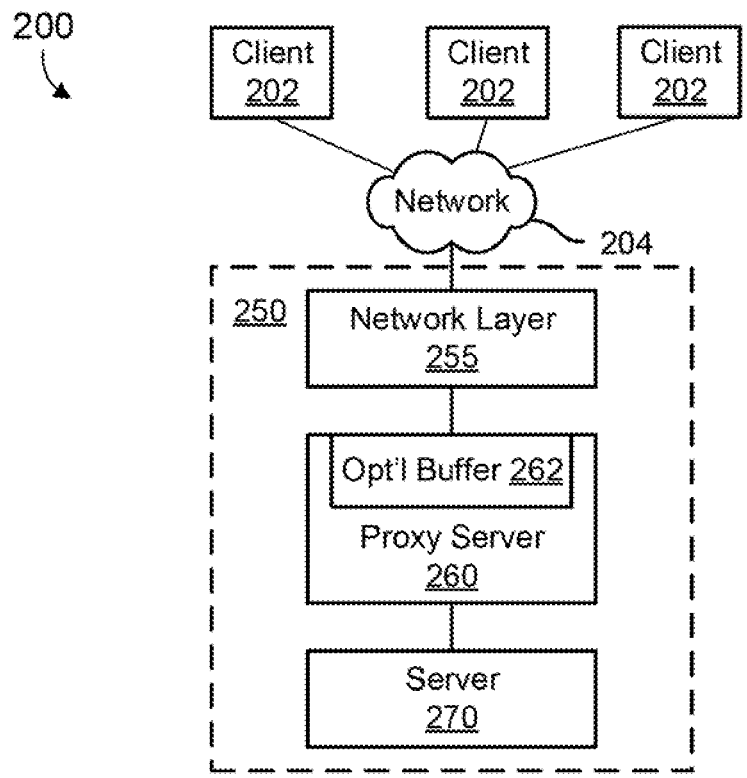
FIG. 2 is a block diagram illustrating an embodiment of a system that provides content proxying between clients and servers.

FIG. 2 is a block diagram illustrating an embodiment of a system 200 that may utilize content proxying. In this example, client devices such as clients 202 connect to a system 250 via a network 204. In some embodiments, system 250 may be a distributed network platform, a data center or other system for accessing server 270. A client device can be a laptop computer, a desktop computer, a tablet, a mobile device, a smart phone, a wearable networking device, or any other appropriate computing device. In some embodiments, a web browser and/or a standalone client application (not shown) is installed at each client 202, enabling a user to access certain applications hosted by system 250. Network 204 can be the Internet, a private network, a hybrid network, or any other communications network.

In the embodiment shown, a networking layer 255 comprising networking devices (not shown) such as routers, switches, etc. receives communications from client devices 202. These communications may be provided to proxy server 260. Proxy server 260 may be one of a number of proxy servers (additional proxy servers not shown) in system 250. For example, system 250 may be a distributed network service platform in which proxy server 260 and server 270 are included. Server 270 is used to service the requests from clients 202. Server 270 may also be one of a number of servers in system 250. In alternate embodiments, server 270 is remote from system 250. In some embodiments, proxy server 260 and/or server 270 may be physical servers having hardware components and software components, and that may be implemented using a device such as 100. In some embodiments, proxy server 260 and/or server 270 may be an application or virtual machine (VM). A VM is a software implementation of a machine (e.g., a computer) that simulates the way a physical machine executes programs. The components and arrangement of system 250 described above are for purposes of illustration only. The technique described herein is applicable to systems having different components and/or arrangements. Further, system 250 may include additional and/or other components for performing other functions not described herein.

System 250 is configured to facilitate communication between devices utilizing different communication formats, or protocols. This feature is described in the context of clients 202 and server 270. However, communication between other and/or additional devices supporting different formats may be allowed. For example, client 202 may desire to access functions hosted by server 270. However, client 202 may use an HTTP/2 format for communications while server 270 may support an HTTP/1 format, or vice versa. HTTP/1 format utilizes data chunks, each of which includes a chunk length header that indicates the content length of the data in the chunk as well as a chunk trailer that includes a delimiter marking the end of the data chunk. In contrast, HTTP/2 format utilizes frames, which do not include chunk length headers in each frame. Stated differently, the HTTP/2 format does not indicate the content length in the frame header. HTTP/2 utilizes control frames that are provided initially in a data stream and, among other functions, may indicate the maximum length of the payload of a frame.

Proxy server 260 may be used to facilitate communication between devices supporting different formats, such as client 202 and server 270. In the example above, proxy server 260 may receive a stream of data from client 202 in the HTTP/2 format of client 202. The format of client 202 is not supported by server 270, which implements HTTP/1. To receive the stream of data, proxy server 260 reads one or more frames of the data stream from a socket of network layer 256 corresponding to client 202. The payloads from these frames are a received payload. Proxy server 260 encodes the received payload into a data chunk including a chunk length header and the received payload. The chunk length header indicates the amount of data in the received payload (i.e. the length of the received payload). The data chunk may also include a chunk trailer having a delimiter for the data chunk. Thus, proxy server 260 converts the data from the data stream of client 202 to a chunk format such as HTTP/1. Proxy server 260 forwards the data chunk to server 270 that supports the format of the data chunk. In some embodiments, proxy server 260 encodes the received payload into the data chunk without buffering. In such embodiments, buffer 262 might be omitted. In other embodiments, proxy server 260 includes and may use buffer 262. In some embodiments, buffering may be enabled for buffering up to a configured amount of data. The configured amount of data may be the maximum amount of data buffer 262 can store.

In other embodiments, the configured amount of data may be a selected amount of data not exceeding the size of buffer 262. In such embodiments, proxy server 260 stores (e.g. buffers) up to the configured amount of data from an initial portion of the stream of data in buffer 262. Proxy server encodes the configured amount of data is encoded into an initial data chunk including an initial chunk length header and the configured amount of data. The initial data chunk is forwarded by proxy server 260 to the sever 270. Subsequently, data may be read, encoded in data chunks and forwarded as data chunks without buffering. In some embodiments in which buffering is enabled, the stream of data has a total size not exceeding the configured amount of data. In some embodiments, proxy server 260 buffers the stream of data and encodes the stream of data into a content length packet including a content length header and the total size. The content length packet may then be forwarded to server 270. Proxy server 260 encodes the data stream from one format supported by one device to another format supported by another device. Thus, system 250 facilitates communication between devices that utilize different formats, or protocols.

Figure 3:
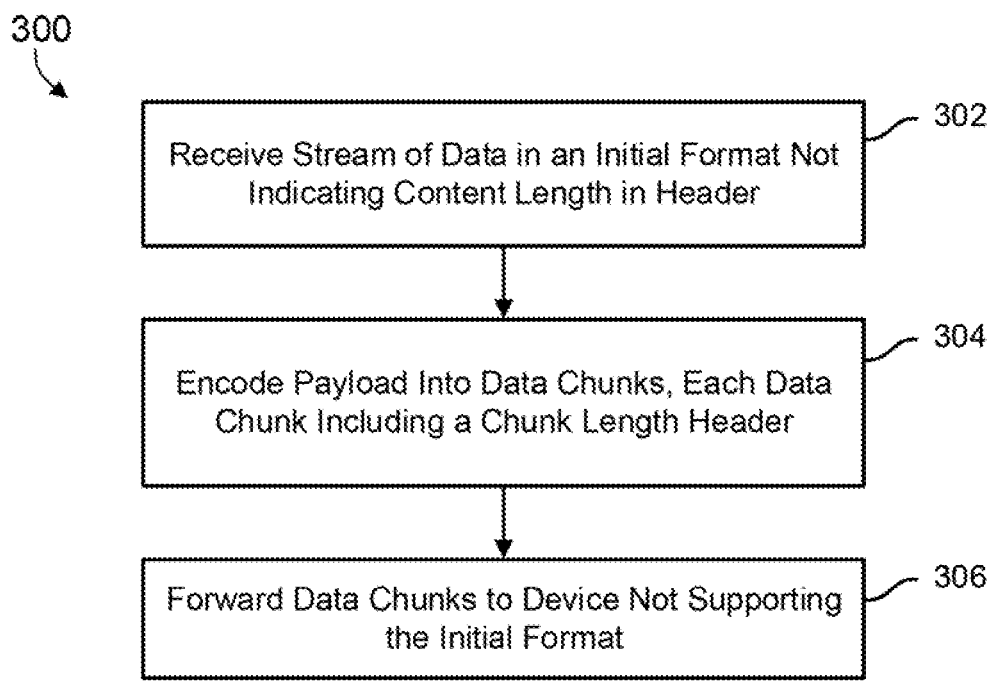
FIG. 3 is flow chart depicting an embodiment of a method for content proxying between two devices having different formats.

FIG. 3 is flow chart depicting an embodiment of method 300 for content proxying between two devices having different formats. Method 300 thus provides a process for devices using different protocols to communicate. Method 300 is described in the context of processes having a particular order. However, the processes may include subprocesses and may be performed in another order including but not limited to in parallel. Method 300 is described in the context of system 250. In some embodiments, method 300 is performed by proxy server 260. In other embodiments, method 300 may be performed by other and/or additional components.

A stream of data from a first device is received, at 302. In some embodiments, the stream of data is a stream of data packets, each of which carries a payload. The stream of data has a format that does not include a chunk length header or other indicator of the payload size in headers of data packets. For example, the stream of data may be a frame-based format, such as HTTP/2. In such embodiments, the data packets are frames and do not include chunk length headers or an analogous indication of the length of the payload in the header. In some embodiments, the data stream is in another format that does not include an indication of the content length in the header of a data packet. At 302, one or more data packets may be read, or otherwise received, from the stream.

The payload(s) of the data packet(s) received in the data stream ("received payload") is encoded into a data chunk, at 304. The data chunk includes not only the received payload, but also a chunk length header. The chunk length header indicates the length of the received payload (i.e. the amount of data carried in the data chunk as payload). In some embodiments, the chunk length header is expressed as a hexadecimal number. In some embodiments, encoding the data chunk at 304 also includes providing a chunk trailer. The chunk trailer includes a delimiter or other structure marking the end of the data chunk.

Figure 4:
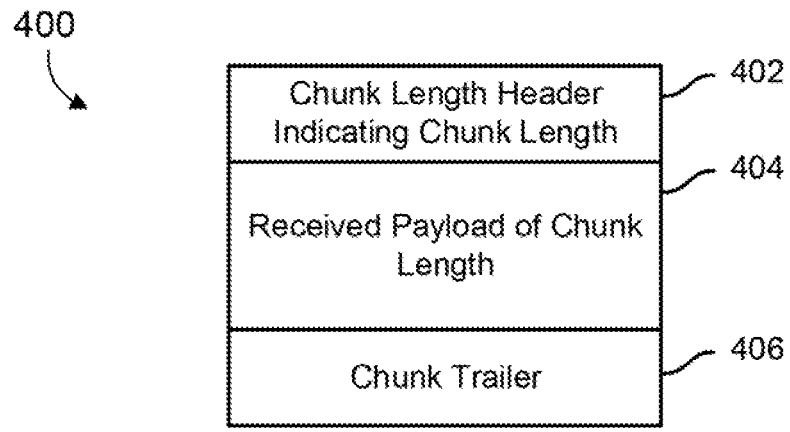
FIG. 4 depicts an exemplary embodiment of a data chunk.

For example, FIG. 4 depicts an embodiment of a data chunk encoded at 304. Data chunk 400 includes a chunk length header 402, payload 404 and chunk trailer 406. The chunk length header 402 indicates the length of the received payload. The received payload from one or more frames resides in payload 404. For example, if the received payload is from one frame of data, payload 404 includes a single payload from that frame. If the received payload is from multiple frames, then payload 404 includes the data (i.e. content or payload) carried by the multiple frames. The chunk trailer 406 includes an indicator of the end of chunk 400. For example, data chunk 400 may be expressed as:

X\received payload\\ where X is chunk length header 402 (the length of the received payload expressed as hexadecimal number X), "received payload" is payload 404, and \\ is chunk trailer 406.

Returning to FIG. 3, the data chunk is forwarded to the second device, at 306. Method 300 may be repeated iteratively to read, encode, and forward data from the data stream. For example, data from some packets is received at 302. As the data is encoded at 304 and/or forwarded at 306, more data may be received at 302. In addition, some or all of 302, 304 and 306 may be performed in parallel. This process repeats to provide the stream of data from the first device and in the format of the first device to the second device in the format of the second device. Thus, communication between the first and second device may be achieved.

For example, suppose server 270 utilizes a first format that does not include the length of the payload in the data packet header such as HTTP/2 and client 202 uses a second format that requires the length of the payload in the data packet header, such as HTTP/1. Thus, server 270 and client 202 utilize incompatible formats. Proxy server 260 may utilize method 300 to facilitate communication between server 270 and client 202.

At 302, proxy server 260 receives a stream of data from server 270 in the HTTP/2 format of server 270. At 302, therefore, proxy server 260 reads one or more frames of the data stream from server 270. The data initially read from server 270 may or may not be buffered. The payload of these frames is a received payload. Proxy server 260 encodes the received payload from the frame(s) into a data chunk such as data chunk 400 including a chunk length header 402, payload 404 and, in some embodiments, a chunk trailer 406. The payload 404 includes the received payload from the frame(s) read. Chunk length header 402 indicates the content length of the received payload from the frame(s) and carried by data chunk 400. At 306, proxy server 260 forwards data chunk 400 to client 202. Proxy server 260 may repeat method 300 multiple times while managing the communication between server 270 and client 202.

Thus, server 270 and client 202 that use different, incompatible formats may be able to communicate via method 300 and proxy server 260. Server 270 may respond to service requests and applications hosted by server 270 may be accessed by client 202 using a different format for communication. Performance and flexibility of system 200 may thus be improved.

Figure 5:
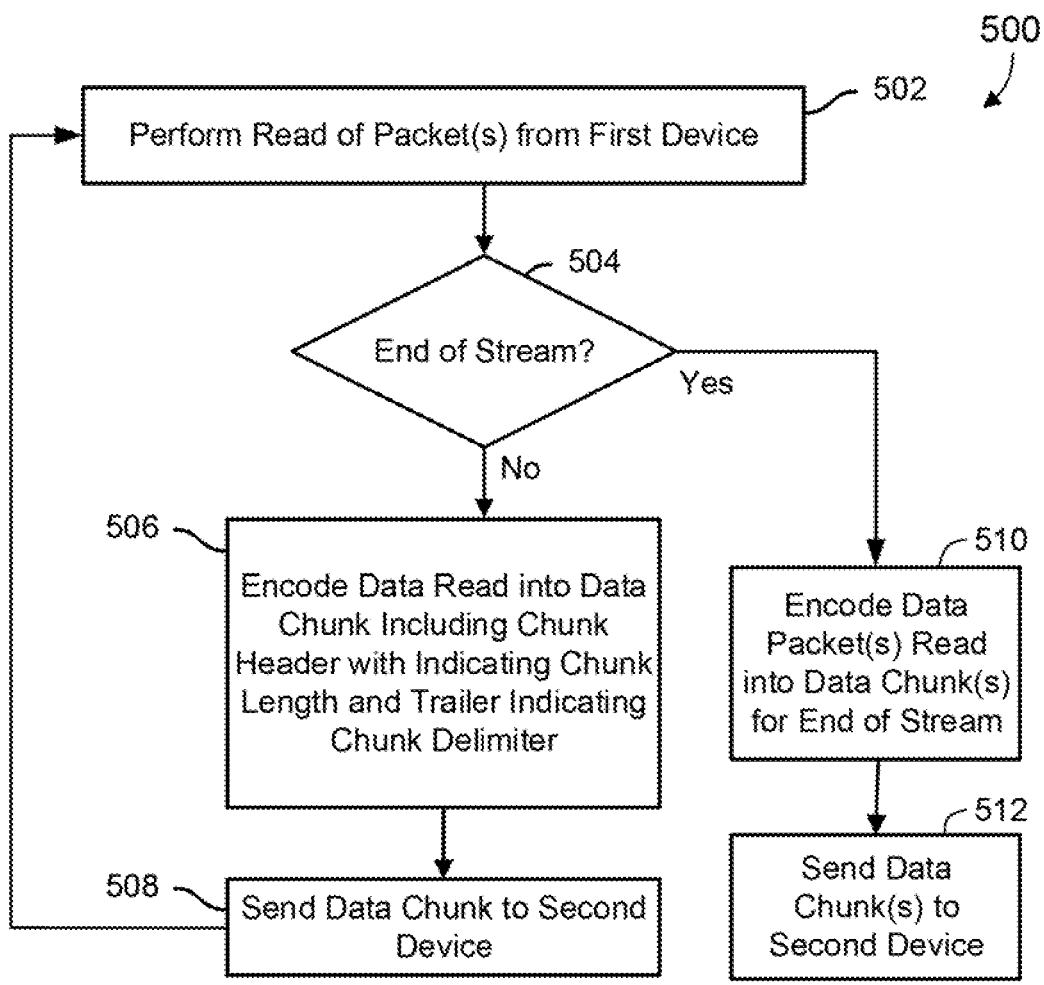
FIG. 5 is flow chart depicting an embodiment of a method for content proxying between two devices having different formats.

FIG. 5 is flow chart depicting an embodiment of method 500 for content proxying between two devices having different formats. Method 500 thus provides a process for devices using different protocols to communicate. Method 500 is analogous to method 300, but includes specialized encoding for the end of the data stream. Method 500 is described in the context of processes having a particular order. However, the processes may include sub-processes and may be performed in another order including but not limited to in parallel. Method 500 is described in the context of system 250. In some embodiments, method 500 is performed by proxy server 260. In other embodiments, method 500 may be performed by other and/or additional components.

A read of one or more data packets in a data stream from a first device is performed, at 502. The stream of data is formatted in a format that does not indicate content length in headers of data packets or does not do so in the same manner as the format utilized by the second device. For example, the stream of data may be a frame-based format, such as HTTP/2, or another format that does not include a chunk length header. It is determined whether the data packet(s) read include the end of the data stream, at 504. The end of stream determination at 504 depends upon the format of the data stream. For example, for an HTTP/2 data stream, it is determined whether a frame read has the end of stream flag set. If the flag is not set, then the end of the data stream has not been reached.

If the end of the stream has not been reached, then the payload(s) of the data packet(s) received in the data stream (the received payload) is encoded into a data chunk, at 506. The data chunk includes at least the received payload and a chunk length header indicating the length of the received payload. In some embodiments, the data chunk also includes a chunk trailer having a delimiter or other indicator of the end of the data chunk. The data chunk is forwarded to the second device, at 508. 502, 504, 506 and 508 may be iteratively repeated to read packet(s), encode packet(s) to chunks and send the chunks to the second device. The second device utilizes a format compatible with the data chunks. Some or all of 502, 504, 506 and 508 may be performed in parallel. For example, as data chunks are encoded at 506 and sent at 508, additional data packets may be read at 502.

If at 504 the end of the data stream is detected, then an end of stream data chunk is encoded at 510. In some embodiments, multiple data chunks are encoded at 510. For example, if multiple data packets including the last data packet in the data stream are read at 502, then the payload(s) for the data packets may be encoded into one data chunk in a manner analogous to 506. In addition, the end of the stream is also indicated in a data chunk. In some embodiments, a separate end of stream data chunk is encoded at 510. For example, a data chunk with an empty payload may be provided. In some embodiments, the end of the data stream may be otherwise indicated, for example by setting a flag in a data chunk including a payload. In some embodiments, only an end of stream data chunk is read at 502. In such embodiments, only the end of stream data chunk is encoded at 510. The data chunk(s) encoded at 510 are sent to the second device, at 512.

Figure 6:
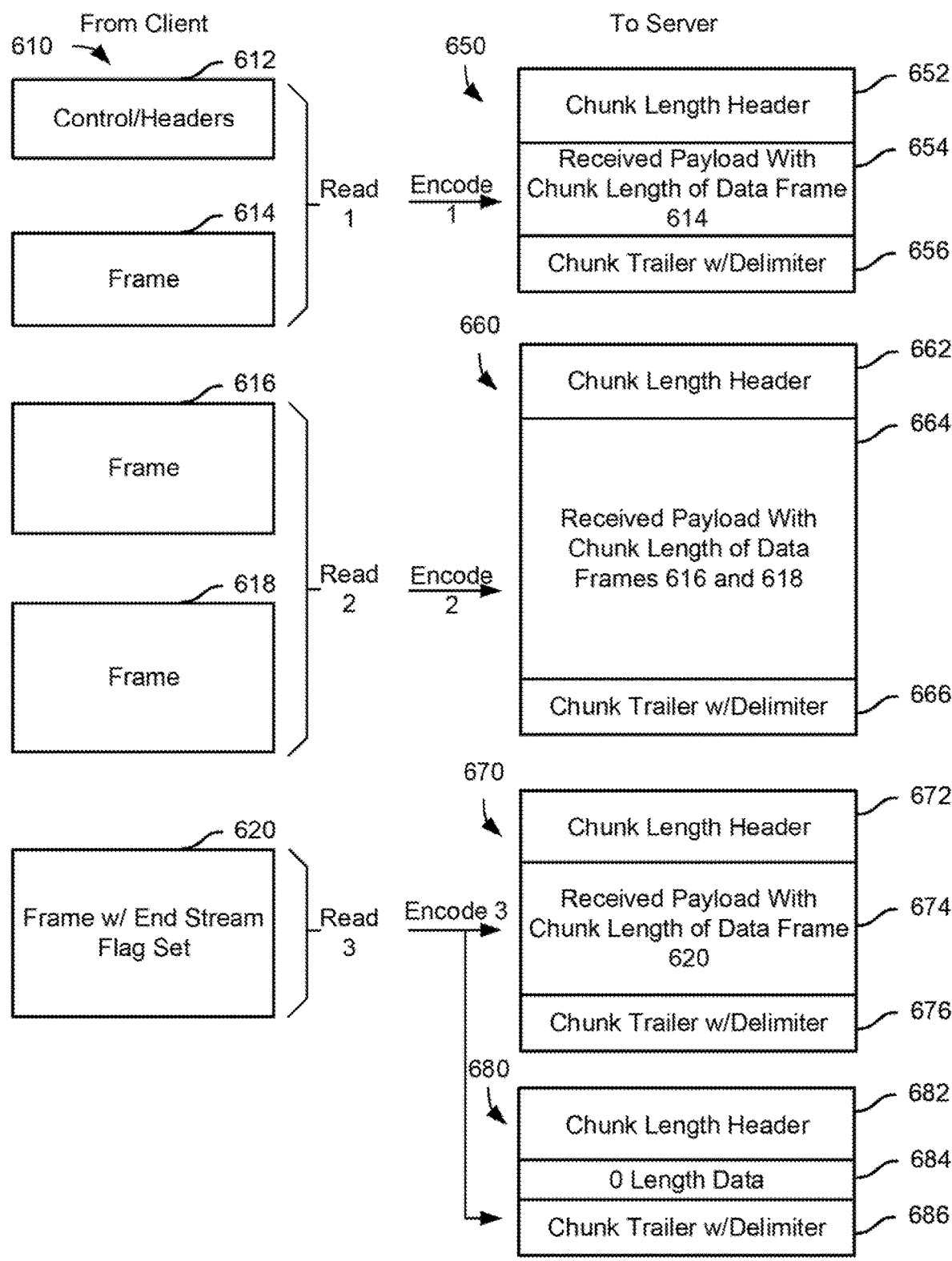
FIG. 6 depicts an exemplary embodiment of a mechanism converting between formats.

Using method 500, devices utilizing different formats for communication may exchange data. For example, FIG. 6 depicts an exemplary embodiment of a mechanism converting between formats using method 500. Suppose client 202 provides the data stream 610 in a first format that does not include the length of the payload in the data packet header such as HTTP/2. In this example, a data packet is a frame 612, 614, 616, 618, or 620. For simplicity, particular fields such as headers and other features of frames 612, 614, 616, 618 and 620 are not shown. Server 270 uses a second format that requires the length of the payload in the data packet header such as HTTP/1. Server 270 may thus use chunked encoding. Thus, server 270 and client 202 utilize incompatible formats. Proxy server 260 utilizes method 500 to facilitate communication between server 270 and client 202.

At 502, proxy server 260 performs a read (Read 1) of data packet(s) in data stream 610 from client 202. Thus, frames 612 and 614 are read at 502. Control frame 612 provides information related to the data stream and frames, while data frame 614 includes a payload. It is determined that the frames 612 and 614 are not the end of the data stream at 504. Thus, proxy server 260 encodes the payload from frame 614 into data chunk 650 at 506. Data chunk 650 includes chunk length header 652, received payload 654 and chunk trailer 656. In some embodiments, data chunk 650 may include additional information and/or fields (not shown). Chunk length header 652 indicates the length of received payload 654. For example, chunk length header 652 may be a hexadecimal number indicating the length of received payload 654. This is the length of the payload for frame 614 obtained at Read 1. The received payload 654 includes the payload (i.e. the data) from frame 614. Proxy server 260 forwards data chunk 650 to server 270 at 508.

Another read (Read 2) of frames 616 and 618 is performed by proxy server 260 at 502. Proxy server 260 determines that frames 616 and 618 are not the end of data stream 610, at 504. Consequently, proxy server 260 encodes the payload of frames 616 and 618 into data chunk 660, at 506. Data chunk 660 includes chunk length header 662, received payload 664 and chunk trailer 666. Chunk length header 662 indicates the length of received payload 664, for example as a hexadecimal number. This is the length of the payloads for both frames 616 and 618 obtained at Read 2. Received payload 664 includes the payload (i.e. the data) from frames 616 and 618. Proxy server 260 forwards data chunk 660 to server 270 at 508.

Proxy server 260 performs another read (Read 3) of frame 620 at 502. Frame 620 has an end of stream flag set. Thus, proxy server 260 determines that frame 620 is the end of data stream 610, at 504. Consequently, proxy server 260 encodes the payload of frame 620 into data chunk 670, at 510. Data chunk 670 includes a chunk length header 672, a received payload 674 and chunk trailer 676. The chunk length header indicates the length of received payload 674. This is the length of the payload for both frame 620 obtained at Read 3. Received payload 674 includes the payload (i.e. the data) from frame 620. In addition, because proxy server 260 determined that frame 620 is the end of data stream 610, proxy server 260 encodes end of stream packet 680. End of stream packet data chunk 680 includes a chunk length header 682, a received payload 684 and chunk trailer 686. However, because data chunk 680 is an end of stream data chunk, received payload 684 has zero length. Thus, chunk length header 682 indicates that the received payload 684 is empty. Proxy server 260 forwards data chunks 670 and 680 to server 270 at 512.

Thus, using method 500, server 270 and client 202 that using different, incompatible formats may be able to communicate. Server 270 may respond to service requests and applications hosted by server 270 may be accessed by client 202 using a different format for communication. Performance and flexibility of system 200 may thus be improved.

Figure 7:
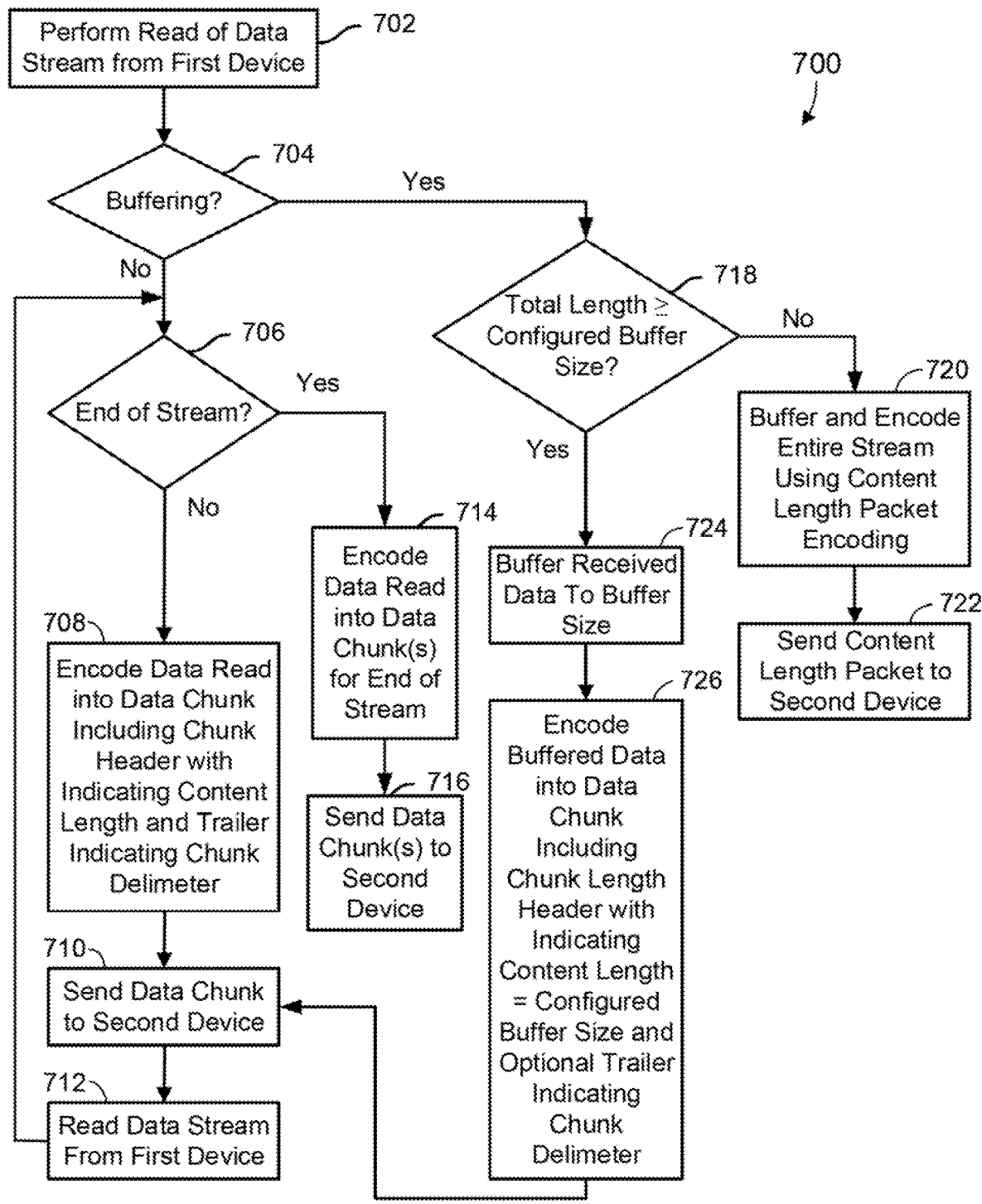
FIG. 7 depicts an exemplary embodiment of a method for content proxying.

FIG. 7 depicts an exemplary embodiment of method 700 for content proxying. Method 700 thus provides a process for devices using different protocols to communicate. Method 700 is analogous to methods 500, but includes buffering for at least a portion of the data stream. Method 700 is described in the context of processes having a particular order. However, the processes may include subprocesses and may be performed in another order including but not limited to in parallel. Method 700 is described in the context of system 250. In some embodiments, method 700 is performed by proxy server 260 and used to allow communication between client 202 and server 270. In other embodiments, method 700 may be performed by other and/or additional components for allowing communication between other and/or additional devices.

A read of one or more data packets in a data stream from a first device is performed, at 702. In some embodiments, 702 is analogous to 502. It is determined whether buffering is enabled, at 704. If not, method 700 proceeds in a manner analogous to method 500. Thus, it is determined whether the data packet(s) read include the end of the data stream, at 706. In some embodiments, 706 is analogous to 504. If the end of the stream has not been reached, then the payload(s) of the data packet(s) received in the data stream (the received payload) is encoded into a data chunk, at 708. In some embodiments, 708 is analogous to 506. The data chunk includes at least the received payload and a chunk length header indicating the length of the received payload. In some embodiments, the data chunk also includes a chunk trailer having a delimiter or other indicator of the end of the data chunk. The data chunk is forwarded to the second device, at 710. In some embodiments, 710 is analogous to 508. Another read is performed at 712. Thus, 712 is analogous to 702. 706, 708, 710 and 712 may be iteratively repeated to read packet(s), encode packet(s) to chunks and send the chunks to the second device. The second device utilizes a format compatible with the data chunks. Some or all of 702. 706, 708, 710 and 712 may be performed in parallel. For example, as data chunks are encoded at 708 and sent at 710, additional data packets may be read at 712.

If at 706 the end of the data stream is detected, then an end of stream data chunk is encoded, at 714. In some embodiments, 714 is analogous to 510. The data chunk(s) encoded at 714 are sent to the second device, at 716. In some embodiments, 716 is analogous to 512.

If, however, it is determined that buffering is enabled, then it is determined whether the total length of all packets of the data stream meet or exceed the configured amount of data for the buffer, at 718. The buffer may be configured to buffer not more than a configured amount of data. The configured amount of data may be selected by a user, network administrator or other authorized individual. In some embodiments, the configured amount of data may be up to the maximum size of the buffer. In other embodiments, the configured amount of data may be smaller than the buffer.

If the amount of data in the data stream is less than the configured amount of data (e.g. less than what the buffer is configured to hold), then content length encoding may be utilized. Thus, the entire stream is stored in the buffer and encoded into a single content length packet, at 720. The content length packet includes a content length header that indicates the total payload of the data stream. The content length packet is forwarded to the second device, at 722.

If it is determined at 718 that the total length of the data stream is greater than or equal to the configured length of the buffer, then the initial portion of the data stream is buffered. Thus, data is buffered until the configured amount of data is reached, at 724. Thus, 724 may include multiple reads of the data stream. The configured amount of data is encoded into a data chunk, such as data chunk 400, at 726. The data chunk includes a chunk length header, a received payload and, in some embodiments, a chunk trailer. The chunk length header indicates that the received payload is the configured buffer size. The received payload includes the contents of the buffer. The chunk trailer includes a delimiter marking the end of the data chunk. This data chunk is sent to the second device, at 710. Another read is performed at 712. In the embodiment shown, therefore, only the initial portion of the data stream up to the configured amount of data is buffered. Subsequently, the data read is not buffered. In some embodiment, however, data buffering analogous to steps 724 and 726 may be carried out multiple times. In some such embodiments, the entire data stream may be buffered. However, in general, only some portion of the data stream is buffered.

Using method 700, devices utilizing different formats for communication may exchange data. For example, suppose client 202 provides the data stream in a first format that does not include the length of the payload in the data packet header, such as HTTP/2. Server 270 uses a second format that requires the length of the payload in the data packet header such as HTTP/1. Server 270 may thus use chunked encoding. At 702, proxy server 260 performs a read of data packet(s) (e.g. frames) in a data stream from client 202. Proxy server 260 determines at 704 whether buffering is enabled. If not, then method 700 proceeds in an analogous manner to described above with respect to FIGS. 5 and 6. If, however, buffering is enabled, then proxy server 260 determines whether the total length of the data stream meets or exceeds the size of configured size of buffer 262, at 718. If not, then proxy server 260 utilizes content length encoding. Thus, the entire data stream is buffered in buffer 262 and then encoded using content length encoding, at 720. Thus, a data packet including a content length header and the contents of buffer 262 is provided. The content length header indicates the entire amount of data in the data stream.

If proxy server 260 determines that the total length of the data stream is not smaller than the configured amount of data for buffer 262, then at least an initial portion of the data stream is buffered. Thus, the received data is buffered until the configured amount of data is reached in buffer 262, at 724. The buffered data is encoded into an initial data chunk, at 726. The data chunk includes a chunk length header, a received payload and, in some embodiments, a chunk trailer. The chunk length header indicates the length of the received payload, which is also the configured amount of data. The received payload is the configured amount of data from buffer 262. The data chunk is sent to server 270 at 710. Proxy server 260 reads the data stream again at 712. Subsequently, proxy server 260 reads, encodes and sends data in a manner analogous to method 500 in 705, 708, 710, 712, 714 and 716 of method 700.

Thus, using method 300, 500 and/or 700, server 270 and client 202 using different, incompatible formats may be able to communicate. Server 270 may respond to service requests and applications hosted by server 270 may be accessed by client 202 using a different format for communication. Further, the data stream may be buffered. Performance and flexibility of system 200 may thus be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of content proxying, comprising:
    receiving from a first device a stream of data comprising a set of headers and a set of payload segments that is formatted in a first format that does not indicate content length in a header;
    encoding at least one of the payload segments of the received stream of data into a data chunk in a second format, the data chunk comprising (i) a header indicating a length of the data chunk and (ii) the at least one payload segment; and
    forwarding the data chunk to a second device, wherein the second device does not support the first format.

2. The method of claim 1, wherein the first device is a client and the second device is a server.

3. The method of claim 1, wherein the first device is a server and the second device is a client.

4. The method of claim 1, wherein the first format is a framing-based format.

5. The method of claim 4, wherein the first format is an HTTP/2 format and the second device supports an HTTP/1 format.

6. The method of claim 1, wherein the data chunk further comprises a chunk trailer having a delimiter for the data chunk.

7. The method of claim 1, wherein the at least one payload segment includes data from a read of a client socket such that the received payload is encoded into the data chunk without buffering.

8. The method of claim 1, wherein buffering is enabled for a configured amount of data, wherein the data chunk is a first data chunk and the header is a first header, the method further comprising:
    buffering the configured amount of data from an initial portion of the stream of data;
    encoding the configured amount of data into a second data chunk comprising (i) a second header indicating a length of the second data chunk and (ii) the configured amount of data, wherein the second data chunk is an initial data chunk; and
    forwarding the initial data chunk to the second device.

9. The method of claim 1, wherein the stream of data is a first stream of data, wherein buffering is enabled for a configured amount of data, and wherein a second received stream of data has a total size not exceeding the configured amount of data, the method further comprising:
    buffering the second stream of data;
    encoding the second stream of data into a content length packet including a content length header and the total size; and
    forwarding the content length packet to the second device.

10. A system for content proxying, comprising:
    at least one processor configured to:
        receive from a first device a stream of data comprising a set of headers and a set of payload segments that is formatted in a first format that does not indicate content length in a header;
        encode at least one of the payload segments of the received stream of data into a data chunk in a second format, the data chunk comprising (i) a header indicating a length of the data chunk and (ii) the at least one payload segment; and
        forward the data chunk to a second device, wherein the second device does not support the first format; and
    at least one memory coupled to the at least one processor and configured to provide the at least one processor with instructions.

11. The system of claim 10, wherein the first device is a client and the second device is a server.

12. The system of claim 10, wherein the first device is a server and the second device is a client.

13. The system of claim 10, wherein the first format is a framing-based format.

14. The system of claim 13, wherein the first format is an HTTP/2 format and the second device supports an HTTP/1 format.

15. The system of claim 10, wherein the data chunk further comprises a chunk trailer having a delimiter for the data chunk.

16. The system of claim 10, wherein the at least one payload segment includes data from a read of a client socket such that the received payload is encoded into the data chunk without buffering.

17. The system of claim 10, wherein the data chunk is a first data chunk and the header is a first header, the system further comprising:
a buffer storing up to a configured amount of data, wherein buffering is enabled, and wherein the processor is further configured to:
buffer the configured amount of data from an initial portion of the stream of data;
encode the configured amount of data into a second data chunk comprising (i) a second header indicating a length of the second data chunk and (ii) the configured amount of data, wherein the second data chunk is an initial data chunk; and
forward the initial data chunk to the second device.

18. The system of claim 10, wherein the stream of data is a first stream of data, the system further comprising:
a buffer storing up to a configured amount of data, wherein buffering is enabled for a configured amount of data and wherein the stream of data has a total size not exceeding the configured amount of data, and wherein the processor is further configured to:
buffer the second stream of data;
encode the second stream of data into a content length packet including a content length header and the total size; and
forward the content length packet to the second device.

19. A non-transitory computer readable storage medium storing a program which when executed by at least one processing unit performs content proxying, the program comprising sets of instructions for:
receiving from a first device a stream of data comprising a set of headers and a set of payload segments that is formatted in an HTTP/2 format that does not indicate content length in a header;
encoding at least one of the payload segments of the received stream of data into a data chunk in an HTTP/1 format, the data chunk comprising (i) a header indicating a length of the data chunk and (ii) the at least one payload segment;
forwarding the data chunk to a second device, wherein the second device does not support the HTTP/2 format.

20. The non-transitory computer readable storage medium of claim 19, wherein the second device supports the HTTP/1 format.

* * * * *